Nov. 12, 1935.　　　　E. FÉCHOZ　　　　2,020,462
AUTOMATIC MACHINE FOR THE MANUFACTURE OF
BOTTLES AND OF OTHER GLASS ARTICLES
Filed Nov. 4, 1932　　　　4 Sheets-Sheet 1

Etienne Féchoz
INVENTOR

By （signature）
his ATTY.

Nov. 12, 1935.  E. FÉCHOZ  2,020,462
AUTOMATIC MACHINE FOR THE MANUFACTURE OF
BOTTLES AND OF OTHER GLASS ARTICLES
Filed Nov. 4, 1932    4 Sheets-Sheet 3

Etienne Féchoz
INVENTOR
By [signature]
his ATTY.

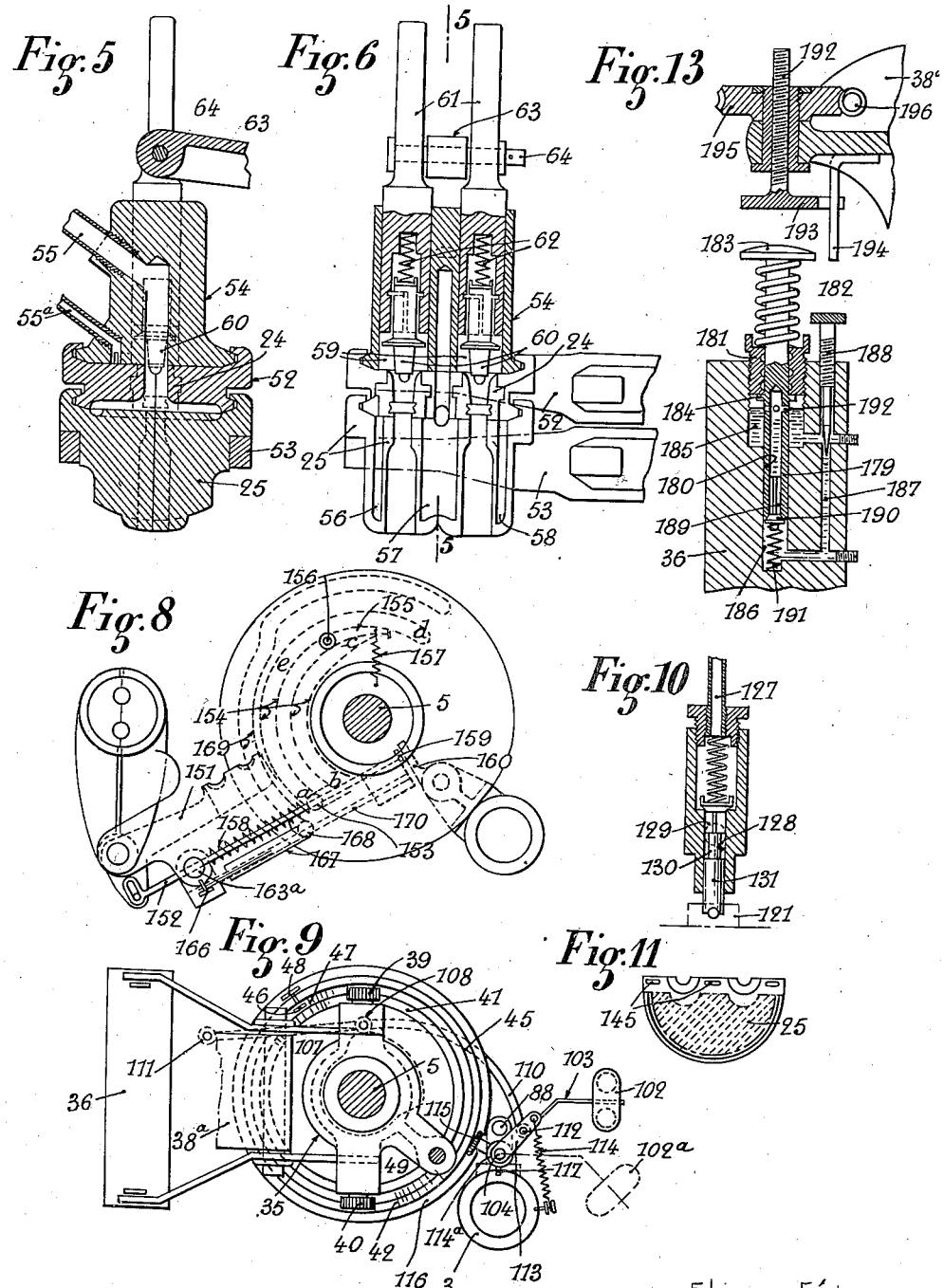

Patented Nov. 12, 1935

2,020,462

UNITED STATES PATENT OFFICE 2,020,462

AUTOMATIC MACHINE FOR THE MANUFACTURE OF BOTTLES AND OF OTHER GLASS ARTICLES

Etienne Féchoz, Gilly-sur-Isere, France

Application November 4, 1932, Serial No. 641,154
In France November 18, 1931

7 Claims. (Cl. 49—5)

The present invention relates to an automatic machine for the manufacture of glass articles by means of two moulds which are successively employed: the first mould serving to suck in a determined quantity of glass, and the second mould serving for the finishing of the article. The first mould consists in reality of two assembled parts, whereof one is termed the finish ring mould, and serves to mould the neck of the bottle, and the other, termed blank mould, serves to mould the body of the blank of the glass article.

In conformity to the invention, the finish ring mould and the blank mould are given successively: a vertical descending movement, which permits the blank mould to make a light contact with the surface of the glass, for the filling of these two moulds by suction, a rising movement, then a horizontal circular movement in order to transport the blank of glass to the finishing position, and lastly, a circular movement in the contrary direction by which the said moulds are returned to the starting point.

The machine further comprises means adapted for the following purposes: for giving to the arm supporting the blank mould two stopping periods at the respective extreme points; for opening or closing the finish ring mould, the blank mould and the finishing mould, according to needs; for operating a knife adapted to remove the excess of glass adhering to the blank mould when it rises above the level of the glass; for bevelling, rounding or trimming off the lower part of the blank and for eliminating all defects due to the cutting by the knife; for cooling the moulds and the plunger; for the obtainment of the suction periods, for starting the operation with the blank, and for blowing the bottle.

Further characteristics of the invention will be set forth in the following description.

In the accompanying drawings, which are given solely by way of example:

Fig. 5 is a view on a larger scale, showing the suction head, the finish ring mould and the blank mould, in section on the line 5—5 of Fig. 6, and F.g. 6 is a corresponding elevational view of the suction head, of a half-shell of the finish ring mould and of a half-shell of the blank mould.

Fig. 7 is a view on a larger scale showing a detail relating to the raising of the plunger for cooling this latter.

Fig. 8 is a separate view of various parts shown in Fig. 4.

Figure 1:
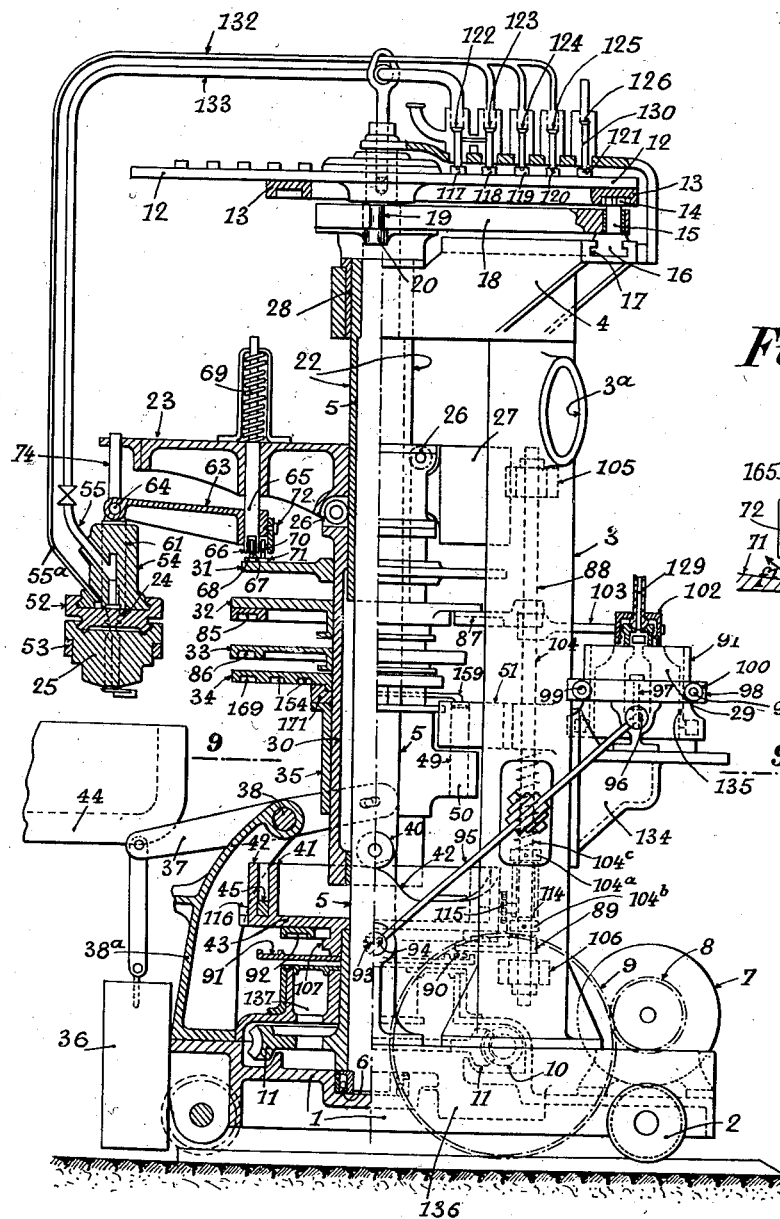
Fig. 1 is an elevational view, and a partial section on the line 1—1 of Fig. 4, of a machine according to the invention.

F'g. 9 is a plan view of certain parts, the view having been taken on the line 9—9 of Fig. 1.

Fig. 10 is a view on a larger scale, of one of the valves for vacuum or compressed air.

Fig. 11 is a view on a larger scale, of one of the cooling nozzles for the blank mould.

Fig. 12 is a view on a larger scale, of a rotary tool for rounding off the bottom of the blank.

Fig. 13 is a view on a larger scale, of a progressive stop for regulating the immersion of the blank mould, and Fig. 14 is a plan view of the controlling device for this stop.

General mechanism of the machine

In the form of construction herein represented, the machine comprises a main frame 1 (Figs. 1 and 2) which may have the form of a carriage, mounted for instance upon four wheels 2.

A supporting upright or column 3 is secured at the lower end to the frame 1. The upright 3 carries at the top a cross-piece 4, in which a central vertical shaft 5 is rotatable and supported at its lower end upon a ball-bearing 6 mounted on the carriage 1. The shaft 5 is constantly rotated at a uniform rate by an electric motor 7, for instance by means of gear wheels 8 and 9 (Fig. 1), and a worm and a worm-wheel 10—11, which is keyed to the shaft 5.

To the upper end of the shaft 5 is keyed a horizontal table 12 (Figs. 1, 2 and 3) which is rotated by the shaft 5 and carries on its lower face a grooved cam 13, co-operating with a roller 14 whose axle pin 15 is secured to a sliding member 16 operating in a radial guide 17 provided in the stationary cross-piece 4. A rack 18 is pivotally mounted on the said axle pin 15 of the roller 14, and is held in contact for instance by a roller 19 and a collar 20, with a toothed sector 21 (Fig. 3), mounted loose on the shaft 5.

The sector 21 is secured, as to rotation, to a sleeve 22 which is loose on the shaft 5, and on the said sleeve is slidable, on a key, a horizontal supporting arm 23. Upon the said arm are mounted, as will be further indicated, the finish ring mould 24 and the blank mould 25.

The connection between the arm 23 and the sleeve 22 is afforded, for instance by two oppositely-situated grooves formed in the said sleeve and serving as guides for two respective keys and also for two rollers 26 (Fig. 1) mounted on the arm 23. A counterweight 27 secured to the arm 23 partially reduces the overhung weight of the said arm.

The sleeve 22 is guided at the top in a bearing member 28 located in the cross-piece 4 which is secured to the upper part of the upright 3.

The operation of the above-described device is as follows. Due to the rotation of the table 12, the cam 13 displaces the sliding member 16 in the fixed radial guide 17, by means of the roller 14 and the axle pin 15 of the rack 18, and thus the said rack will impart to the sector 21 an alternate movement of rotation, as the cam 13 has the form of a closed curve.

Figure 4:
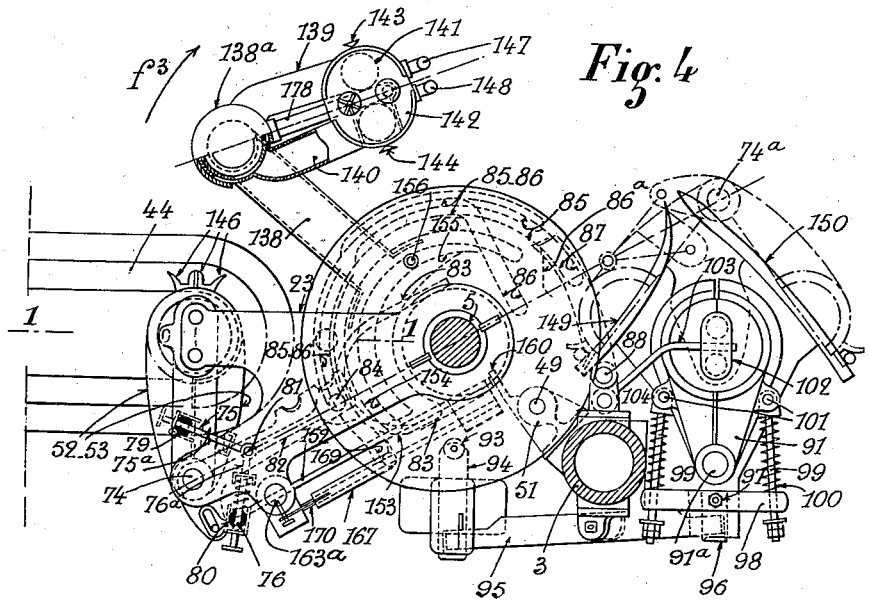
Fig. 4 is another plan view, with the said upper table removed.

This alternate motion is imparted to the arm 23, which moves from the position shown in Fig. 4 to the diametrically opposite position while rotating in the direction of the arrow $f^3$, and then returns to the starting position.

Such alternate movements of the arm 23 provide for a forward and back motion of the finish ring mould 24 and the blank mould 25 which are carried by said arm, from the position shown in Fig. 4 (position when gathering the glass from the trough 44) to the position when the transfer of the blank to the finishing mould, at 29, is operated.

It should be noted that the stopping periods of the arm 23 at each extreme position (suction and transfer) are provided for by the shape of the cam 13, which comprises two portions having the form of concentric curves, one corresponding to the suction period and the other to the transfer period. When proceeding on these concentric curves, the stationary position of the axle 15 of the rack 18, and hence of the arm 23, is theoretically assured, and this position may be made absolute in practice, by a suitable locking device.

*Mechanism for the vertical movements of the arm carrying the moulds*

The said arm 23 rests upon a sleeve 30 (Fig. 1) which is mounted by easy friction at one end upon the sleeve 22 and at the other upon the shaft 5. To the sleeve 30 are secured, at suitable heights, cam plates 31—32—33—34, as well as a collar 35 (Figs. 1 and 9); said collar 35 supports the weight of all of the above-mentioned parts. It is partially balanced by a counterweight 36 mounted on a lever 37 pivoting on the stationary axle 38 secured to the bracket 38a, in such manner that the two supporting rollers 39—40 with which it is provided will be in constant contact with the upper edges of suitable ramps consisting of concentric rings 41 and 42; said ramps form part of a disc 43 (Fig. 1) which is given the same uniform rotation as the central shaft 5. The form of said cams is such that when the blank mould 25 attains the suction position as herein represented, the rollers 39—40 will descend simultaneously, thus lowering the said mould and plunging it in the glass contained in the trough 44 (Fig. 1).

At the end of the suction operation, the rollers 39—40 are raised by their respective ramps 41—42, thus raising the blank mould. During the period of the horizontal forward and back motion of the blank mould, the rings 41—42 will maintain the whole of the aforesaid device at a practically constant level.

An intermediate ring 45 which is movable with easy friction in the space between the rings 41 and 42 upon which the rollers 39 and 40 are adapted to roll when in the lower position, is chiefly intended to limit the lowest point of the plunging. In its operative part, the ring 45 has the form of two inclined planes, and it is thus possible to change the lower limit of the plunging by an angular displacement of this ring.

This displacement may be effected by means of a small pinion 46 (Fig. 9) engaging the lower edge of the ring 45, which has the form of a rack 47; the said pinion is turned for instance by a manually controlled knob 48. The ring 45 may be held in place simply by a set-screw acting upon the outer ring 42.

Another method for regulating the plunging of the moulds will be further described.

In short, the arm 23, the cam discs 31—32—33—34, the collar 35 and the counterweight 36, all of which are connected with the sleeve 30, are only given a vertical movement of descent and rise, at the period of the suction of the glass.

The exact direction of these different parts is preferably maintained by guiding means which may consist of a round rod 49 (Figs. 1 and 4) secured to an appendage 50 of the collar 35 and slidable with easy friction in a corresponding bored recess in a member 51 mounted on the upright 3.

*Description of the finish ring mould (24) and of the blank mould (25) and their accessories (Figs. 1, 3, 4, 5 and 6)*

The finish ring mould 24 consists of two portions which are secured to the respective branches of a mould-holder 52. The blank mould 25 also consists of two parts secured to the respective branches of a mould-holder 53.

The finish ring mould holder 52 and the blank mould 25 are suspended on a suction head 54 by assembling means which are made tight by compression of springs, as will be further set forth.

In this construction, the suction head 54 and the corresponding moulds 24—25 are so arranged as to produce two bottles at the same time, but the principle of their arrangement will remain the same in the case of single, double or triple moulds.

The suction head 54 communicates with two conduits 55 and 55a. The conduit 55 affords connection between a vacuum pump and the grooves 56—57—58 of the blank mould 25 (Fig. 6); the conduit 55 affords connection between the vacuum pump, or a compressor, and the annular space 59 (Fig. 6) surrounding the plungers 60.

The plungers 60 are mounted in the bayonet, or in like manner, upon cylindrical plunger carriers 61. When in their fixed position, they are held by springs 62. They may be lowered into their operative position, or may be raised, by an arm 63 (Figs. 1, 5 and 6) which is connected with the plunger carriers 61 by a pin 64. The arm 63 is mounted on a vertical axle pin 65 which is slidable in the arm 23 and can be raised or lowered by the machine. For this purpose, the axle pin 65 may carry at its lower end a forked bracket 66 containing a roller 67 adapted to roll upon the circular ramp 68 of the disc 31 secured to the sleeve 30, and the said ramp is so arranged that under the action of a spring 69, the plunger will be held in the lower position during the filling of the blank and the finish ring moulds. The plunger is then raised by a projecting part of the ramp 68.

During the horizontal return stroke of the arm 23, it is useful to cool the plungers 60. For this purpose, they must be held in their raised position and a second roller 70 and a second ramp 71 are provided, which act only during the return stroke (Fig. 7).

To this end, the roller is pivotally mounted on an axle 72 (Fig. 7) by which it is connected with the forked bracket 66, but this pivoting motion can only take place in one direction, according to the arrow $f^1$ corresponding to the forward stroke of the blank mold 25. During the return stroke, the roller 70 makes contact with the bracket 66 and is obliged to rise upon the ramp 71, thus raising the plunger-carriers 61 and their plungers 60, in order that the latter may be cooled, for instance by a circulation of compressed air, as will be further set forth.

The mould-holders 52 and 53 are chiefly indicated in Figs. 1, 5 and 6, and also in Fig. 4 which shows their form in plan view; in this figure the two mould-holders, which are alike, are projected one upon the other. Their form is similar to that of a pair of pinchers, and they are pivotally mounted on a vertical rod 74 secured to the arm 23. For each mould, the branches are spread away or brought together by the common action of two springs 75—76 which surround respective rods 75a—76a and bear at one end upon spindles 79—80 mounted on the branches of a pair of pinchers, and at the other end upon a vertical spindle 81. Each spindle 81 is mounted on a rod 82 ending in a strap 83 which is in contact with the lateral walls of the central cylindrical upright 5, thus maintaining the rod 82 in the radial direction. Upon the rod 82 corresponding to the finish ring mould 24 is located a roller 84 co-operating with the cam groove 85 (Figs. 1 and 4) of the disc 32. A like roller 84 mounted on the rod 82 corresponding to the blank mould 25, is engaged in the cam groove 86 (Fig. 1) of the disc 33. During the period of rotation of the arm 23, said cams 85—86 are stationary, and their curvature is such that the rollers 84 take a radial displacement, thus compressing or releasing the corresponding springs, and hence opening or closing the finish ring mould 24 and the blank mould 25.

The cam 86 will not bring the corresponding roller 84 to the extreme position of travel of the arm 23 in the direction of the arrow $f^3$ (Fig. 4). Said roller passes upon another cam 87 which is pivotally mounted on a vertical shaft 88 (Fig. 4).

The shaft 88 may be turned in either direction, for instance by means of a lever 89, shown at the lower part of Fig. 1. One end of said lever is keyed to the shaft 88, whilst the other end carries a roller 90 co-operating with the groove of a cam 91 which is rotated at a constant rate, as it is secured to the central shaft 5.

To obtain a more exact coincidence of the cam grooves 85 and 87, there is provided a stationary ramp 86a (Fig. 4) consisting of a horizontal strip bearing obliquely against the cam 87, and thus the said ramp will constitute the enveloping curve of the roller 84, during the forward and the return strokes.

*Finishing mould (29)*

Figure 2:
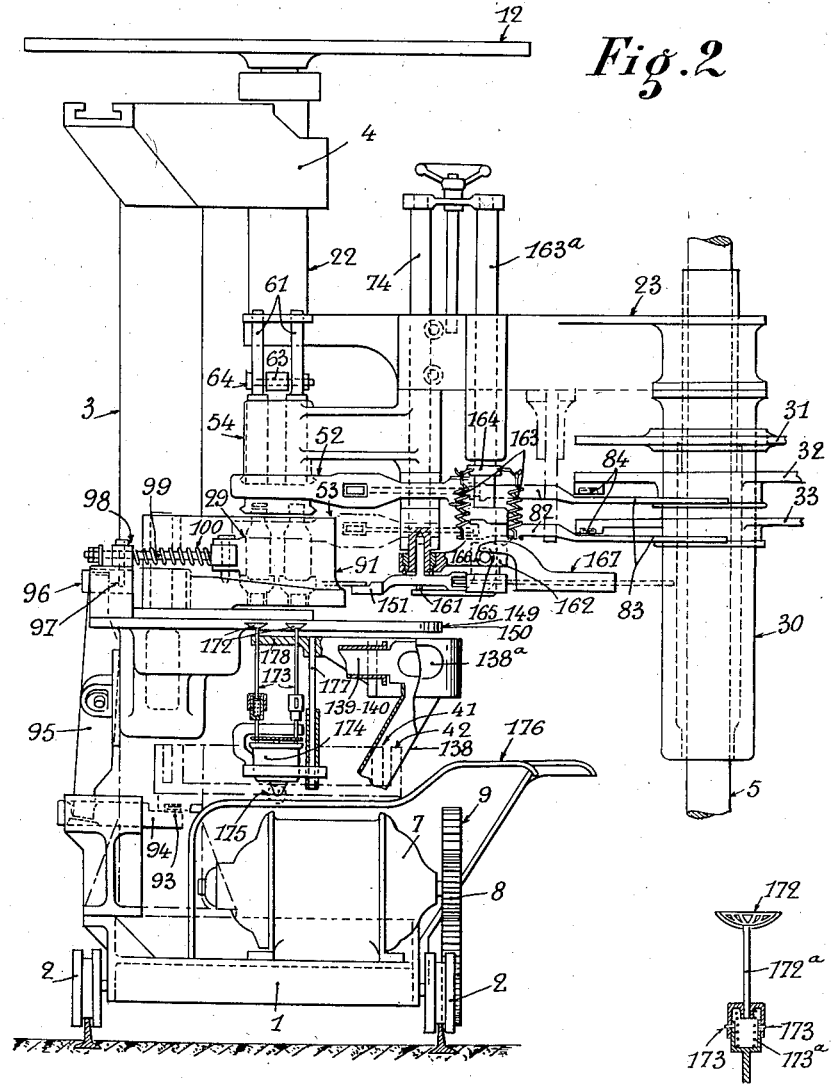
Fig. 2 is another elevational view of the machine, the observer being situated near the position of removal of the articles from the mould, and herein the central part of the machine has been turned down to the right, for greater clearness in the indication of certain parts.

Figs. 1, 2 and 4 indicate the method employed for the opening and closing of the finishing mould 29, the latter being formed of two halves or shells, maintained by a mould-holder 91 whose branches are pivotally mounted on a spindle 91a (Fig. 4).

The device may be operated, as shown in Figs. 1, 2 and 4, by a cam 92 which is given a uniform motion, a roller 93, a piston 94, a pivoting lever 95, a piston 96, a driving shaft 97, a rocking arm 98, rods 99, springs 100 and spindles 101 (Fig. 4).

The finishing mould is located at such height that when the finish ring mould 24 (Fig. 2), due to the horizontal movement of the arm 23 arrives upon it, there will be a slight clearance between the adjacent faces of the finish ring mould and the finishing mould.

It is to be noted that the rods 74 upon which the mould-holders 24—25 are pivoted and the spindle 91a of the carrier 91 of the finishing mould 29 have the symmetrical position with reference to the vertical axis of the mould 29 when the moulds 24—25 are beyond said mould 29 and when the rods 74 thus occupy the position 74a (Fig. 4). In this manner, the moulds 24—25 may be brought into the transfer position without being obstructed by the holders of the finishing mould.

It should be further noted that the planes of the joints of the different moulds are tangent to the cylinder described by the vertical axis of the blank mould during its movement in the direction of arrow $f^3$ and return (Fig. 8).

*Blow head (Figs. 1, 4 and 9). (This head being adapted to press upon the upper face of the finishing mould 29, after the finish ring mould has released the bottle neck for blowing the bottle or bottles)*

This blow head 102 comprises as many bell-shaped devices as there are bottles to be blown. Each bell is yieldingly mounted in order that it may be applied upon the upper face of the mould with all the desirable tightness.

The blow head 102 is mounted on an arm 103 which is secured to a vertical rod 104 adapted to slide vertically in its supports 105—106 (Fig. 1). The partial rotation of said rod is effected as follows. The hub of the disc 43 (Fig. 1) is provided with a collar having the form of a ramp 107 cooperating with a roller 108 (Fig. 9); said roller is mounted on a lever 110, one of the ends of which is pivoted at 111, whilst the other end carries a vertical arm 112 adapted to slide loosely in an aperture provided in a lever 113 which is urged by a spring 114, thus applying the roller 108 against the cam 107. The form of the cam is such that the lever 113 mounted on the same axle as the arm 103 carrying the blow head 102, will bring this head into two extreme positions, that is, the bottle blowing position, and the position corresponding to the release of the blow head (as shown in the dot-and-dash lines at 102a in Fig. 9).

In addition to its pivoting movement, this head 102 can be raised and lowered through a distance somewhat exceeding the height of the bottle neck. For this purpose, the vertical shaft 104 comprises two rings or collars 104a—104b between which is located a concentric rotatable tube 114a (Fig. 9) on which is mounted a roller 115 co-operating with a ramp 116 (Figs. 1 and 9) formed around the disc 43. A stud 117 engaged in a vertical groove in the upright 3 prevents the tube 114a from turning, but the tube and the roller 115 are able to rise or descend. Above the upper stop 104a of the tube 114a is located a spring 104c which surrounds the shaft 104, and is in contact with a stop at its upper end, thus urging the shaft downwardly in order to press the blow head 102 upon the mould 29.

As a final result, the ramps 107 and 116, and the intermediate driving parts, impart to the blow head 102 successive movements of pivoting, of descent upon the finishing mould, of rise, and again of pivoting, in view of its return to its initial position of release, 102a.

*Circuits for vacuum and for compressed air (Figs. 1 and 3)*

The upper rotary table 12 is provided with five concentric ramps 117—118—119—120—121 corresponding to five respective valves for the control of vacuum and compressed air circuits. Said valves give passage to the compressed or withdrawn fluid only when their push-pieces proceed upon the said ramps.

The ramp 117 controls a valve 122 which applies the vacuum to the channels 56—57—58 of the blank mould.

The ramp 118 controls a valve 123 applying the vacuum to the spaces 59 around the plungers 60.

The ramp 119 controls a valve 124 for the compressed air which is destined for piercing the blank.

The ramp 120 controls a valve 125 for the cooling of the plungers 60.

The ramp 121 controls a valve 126 for the final blowing of the bottle in the finishing mould 29.

Fig. 10 shows on a larger scale and by way of example, the valve 126 employed for the final blowing of the bottle. The compressed air enters through a conduit 127 and issues through another conduit 128, passing through a pipe 129 leading to the blow head 102 (Fig. 1). The circulation of air is controlled by the said valve, whose section is in the first place triangular, this being followed by a restricted cylindrical part 130 and then by a round rod 131 forming the push-piece properly so called, this being controlled by the ramp 121 whose length determines the time of the blowing.

Figure 3:
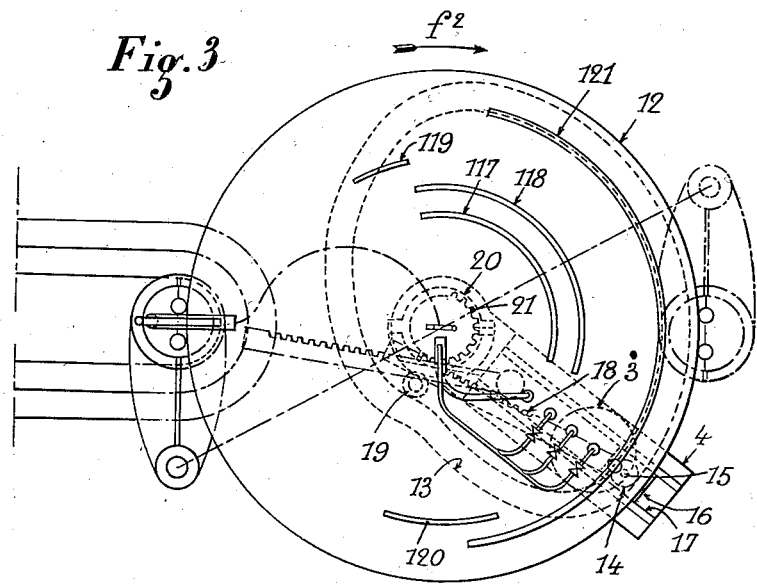
Fig. 3 is a plan view, chiefly showing the upper table.

In Figs. 1 and 3, all of the valves 123—124—125 lead to a common pipe 132 which leads in turn to the connection 55a of the blow head 54 giving access to the plungers 60. The valve 122 communicates, through a pipe 133, with the connection 55 of the blow head, leading to the suction channels 56—57—58 of the blank mould 25. The output can be regulated by cocks mounted on the piping.

*Cooling arrangement for the moulds*

The cooling circuit for the moulds is as follows: The air supplied by an air blower enters through an orifice 3a in the hollow upright 3 (Fig. 1), and circulates upwardly in the interior of said upright. A certain part of this air enters a hollow bracket 134 having at the top two orifices communicating with the respective hollow branches of the support of the finishing mould holder 91, and said branches lead the air to the bottom of the shells or halves of the finishing mould 29, by means of a set of holes which are under suitable control. Thus the air will circulate in a uniform manner in the annular space 135 around the finishing mould 29 (Fig. 1).

The excess of air supplied to the lower part of the hollow upright 3 is brought by means of a chamber 136 (Fig. 1) into a casing containing the wheel 11, and then into an annular chamber 137 surrounding the control upright, from which the air passes into an inclined pipe 138 (Figs. 2 and 4) which leads, through the intermediary of a chamber 138a and two branch conduits 139—140, to the cooling nozzles 141—142 of the respective shells of the blank mould 25.

Fig. 11 shows the arrangement of the air outlet orifices for one of the said nozzles, such orifices being so distributed as to direct the air in the best manner against the walls of the blank mould 25 situated above the nozzles, and chiefly during the cooling period; said nozzles are urged by spring strips 143—144 in such manner that when the blank mould is open, the orifices 145 of the nozzles project for about one centimeter from the planes of the joint of the shells of the mould.

The whole device supporting the nozzles is adapted to pivot about the annular chamber 138a, and it is set in motion by the contact between horn-shaped projections 146 (Fig. 4) provided on the branches of the carrier 52 of the finish ring mould, and the vertical rods 147 and 148 mounted on the respective branches 139 and 140. The two nozzles are separated when the said rods make contact with fixed deflecting members 149—150.

The air is only admitted to the inclined pipe 138 by opening a valve (not shown) which is situated at its lower part and is operated at the end of the stroke, that is, the air is not admitted before the blank mould opens. When this mould is on the way back, a suitable device such as a strip of metal wound around the annular chamber 137, replaces the whole of the cooling device, by means of a counterweight secured to the end of the strip. The cooling action continues during the whole of the first part of this return stroke.

*Knife for removing the excess of glass filling by suction of the blank mould (Figs. 1, 2, 4 and 8)*

For the sake of clearness, the various controlling devices for this knife are shown separately in Fig. 8. The knife-carrier 151 is pivotally mounted on the rod 74 and is operated by a rod 152.

At a certain point on the rod 152 is mounted a roller 153 engaged in a groove 154 in the cam disc 34, said groove forming a closed circuit *abcde*. In the circuit is mounted a pawl-shaped member 155, which is pivoted at 156 and is urged by a spring 157. A spring 158 urges the roller 153 and the operating rod 152 in the direction corresponding to the forward motion of the knife below the mould, but this device cannot be set in motion until the blank mould has risen to its maximum point above the glass, and this is due to the action of a projection 159 which remains pressed against a fixed stop 160; owing to the rise of the whole set of devices pertaining to the blank mould 25, the projection 159 is finally released from the top of the fixed stop 160.

At this moment, the spring 158 abruptly moves out the roller 153, and thus the knife advances below the mould and cuts off the excess of glass. Fig. 8 shows the manner in which the said roller, held by the cam 154, is then driven towards the centre, thus removing the knife. The pawl 155 returns to its initial position by the action of the spring 157, and this takes place when the roller, on the forward stroke *abcd*, has left the front end of the pawl. When the mould 25 comes into the suction position, the spring 158 remains compressed, as the set of devices pertaining to the blank mould has already slightly descended somewhat before attaining the stopping point; thus the projection 159 will have already made contact with the stop 160.

Independently of the cutting movement, the said knife is given a vertical movement by which it may exert pressure below the blank mould 25, or may move aside before it is disengaged.

For this purpose, the knife-carrier 151 (Fig. 2) is simply fitted into a bored recess in the lower end of the rod 74. A stop 161, mounted on a sleeve 162 having the form of a claw-hammer and which is slidable on a rod 163a, holds the knife-carrier in the suspended position, owing to the fact that the sleeve 162 is itself maintained in the raised position by two springs 163 attached to a fixed ring 164. The sleeve 162 may however be lowered by means of a ramp 165, acting upon a roller 166 mounted on the sleeve 162.

The ramp 165 forms part of a sleeve 167, on which is mounted a roller 168 engaging a grooved cam on the disc 34, and thus the said sleeve, which is guided by a fixed rod 170, will follow the motion given to the roller 168 by the curve 169.

In the suction position of the blank mould 25, the knife-carrier 151 will thus be lowered at a very slow rate, and hence the knife will have no appreciable friction on the mould during the cutting action. The knife is then pressed against the mould, and finally, during the last part of the movement of the mould, the knife-carrier is again lowered, chiefly in order to move the knife aside without friction.

It is to be noted that the rods 152 and 170 are held at one end by a member pertaining to the rod 163a, and at the other end by a projection formed on a collar 171 (Fig. 1) adapted for free rotation about the cylindrical sleeve 30.

*Device for bevelling, rounding or trimming the bottom of the blanks; (for removing the burrs of glass produced by the knife)*

This device is based upon the action of a rotating tool of any suitable form, disposed below the bottom of the piece, and removing the burrs; the tool may obviously be roughened in order to give it a better hold. In the construction represented on a larger scale in Fig. 12, the tool 172 has the form of an apertured bowl, for the evacuation of the burr material; said bowl is riveted to a rod 172a which is rotated by means of two studs 173, slidable in vertical slots formed in two sockets, between which is mounted a spring 173a for limiting the vertical pressure of the tool 172 to a suitable value.

The tools 172 can be rotated by any desired form of driving gear. In the construction shown in Fig. 2, an electric motor 174 is employed for the simultaneous rotation of two such tools, (for instance by toothed wheels). This motor 174 is provided with straps having supporting rollers 175 by which it may be displaced upon a double roller race 176. The displacement is effected by means of a spindle 177 mounted on an arm 178 secured to the air chamber 138a.

Since this latter is moved together with the blank mould, the tools will always remain in the vertical axis of the blanks, and when operating in the highest position of the roller race 176, the tools 172 will bevel off the bottom part of each blank. The highest position of the roller race, and the position of the electric contact-pieces for the motor 174 are such that the tools 172 will come into action either immediately after the knife has been removed from the bottom of the blank mould or as soon as the blank mould begins to open.

*General operation of the machine*

The apparatus is supposed to start from the position occupied by the blank mould just before this mould plunges in the trough 44. The mould 25 and the finish ring mould 24 are both tightly closed. The plungers 60 are pressed down. The knife-holder 152 is moved away and occupies the position shown in Fig. 8. The arm 23 is stationary in the circular direction, as the roller 14 actuating the rack 18 is located in one of the two circular parts of the cam 13.

The continuous rotation of the disc 12 in the direction of the arrow $f^2$ (Fig. 3) brings the two supporting rollers 39—40 upon the descending parts of the ramps 41—42, thus lowering all the parts mounted on said rollers, and chiefly the arm 23 and the blank mould 25. This latter makes a light contact with the surface of the glass in the trough 44, and at this time the ramps 117—118 of the upper table 12 have now been brought below the corresponding valves 122—123, and when these latter are opened, a vacuum pump is thus connected with the channels 56—57—58 of the blank mould and also with the annular space 59 surrounding the plungers 60. This vacuum withdraws the glass, and the latter fills entirely the blank mould 25 and the finish ring mould 24.

As the disc 43 continues to rotate, the rollers 39—40 are brought upon the raised parts of the ramps 41—42, thus raising the arm 23 and the blank mould. When this mould comes within a few millimeters of its upper point, the projection 159 of the rod 152 controlling the knife-carrier 151 is released from the stationary stop 160, and thus the spring 158 comes into action and moves the knife as above indicated. The knife cuts off the excess of glass suspended from the mould 25 after the suction has taken place. The outline of the cam 169 is such that in this position, under the action of the inclined plane 165 of the sleeve 167, the knife will make light contact with the bottom of the mould 25, without friction.

As the table 12 continues its rotation according to the arrow $f^2$ (Fig. 3), the roller 14 controlling the rack 18 engages an eccentric part of the cam 13, thus displacing the rack and turning the arm 23 in the direction of the arrow $f^3$ (Fig. 4); said arm will thus move the finish ring mould and the blank mould towards the finishing mould 29. During this movement, the horn-shaped projections 146 of the finish ring mould 24 make contact with the vertical pins 147—148, thus driving the arm 138 in the direction of the arrow $f^3$. During this time, the knife-carrier 151 has been pressed upwardly by the springs 163. At the same time, the ramps 117—118 are out of action; the ramp 119 comes below the valve 123, controlling the distribution of compressed air, thus admitting the air into the annular space 59 around the plungers 60 which are in the raised position, and hence the compressed air commences to enter the blank.

The ramp 119 is then brought out of action, and the cam 169 lowers the knife-holder 151, which disappears from below the mould 25, owing to the suitable form of the ramp 154. The rotating tools 172 commence operation as soon as the knife has been thus displaced, or immediately after the blank mould begins to open under the combined effect of the cam 86 and the fixed deflecting members 149—150. At this time, the finishing mould 29 is opened by means of the cam 92, the bottles formed during the preceding operation having been already removed, by hand or otherwise.

The arm 23 continues its motion according to the arrow $f^3$, thus bringing the finish ring mould 24, which holds the blanks, into the vertical axis of the finishing mould 29. The shells of the blank mould 25 are then held entirely open by the fixed deflecting members 149—150, and are cooled by air delivered to the nozzles 141—142. The arm 23 is held fast when it attains this position of dead centre, as the roller 14 controlling the rack 18 has now entered a part of the cam 13 which is concentric with the shaft 5 of the cam 13. When the arm 23 is stopped, the finishing mould 29, under the effect of the cam 92, is closed, thus surrounding the blanks which are still held by the finish ring mould.

The cam 91, by means of the lever 89 of the shaft 88 and of the part of the cam 87 co-operating with the corresponding roller 84, then opens the finish ring mould 24, and this mould delivers the blanks into the mould 29, in which the bottles remain in position together with their projecting necks.

The arm 23 at once begins to move on its backward stroke in the contrary direction to the arrow $f^3$. When the finish ring mould 24 has been moved aside, the blow head 102 is applied upon the top of the finishing mould 29, and at a given moment the ramp 121 comes below the valve 126, thus delivering compressed air to the interior of the blank or blanks and effecting the final blowing of the bottle or bottles.

During the return stroke of the blank mould, the cooling is continued, since the nozzles 141—142 remain in a position adjacent their corresponding shells. This is not the case during the forward stroke, due to the fact that the air circulation is stopped during this period by a slide-valve, as above indicated. During this return stroke, the blank mould and the finish ring mould are closed, and the plungers 60 are cooled. For this purpose, the ramp 120 comes below the valve 125, thus delivering compressed air around the plunger or plungers 60 which are held in the raised position by the action of the roller 70 engaging the ramp 71. Before the said mould comes into position above the trough 44, this ramp 71 stops acting, and the spring 69 drives the plunger or plungers 60 into their lower position corresponding to the suction period.

After the blank mould has returned to its initial position, the aforesaid movements are repeated in successive cycles, whose duration may be adapted to the size of the bottles, by varying the speed of the machine.

It will be noted that the action of the rotary tools 172 does not necessarily take place during the travel of the blank, and this operation may be performed with equal facility when the blank comes into its position of transfer, and in this case the bottom of the finishing mould 29 will be movable and will take a position below the blank only when the bevelling operation has been completed, which operation is performed when the blank is in the stationary position.

*Modification of the device for regulating the lowest point of plunging of the blank mould 25 (Figs. 13 and 14).*

In this form of construction, a piston 179 is adjusted in a central bore 180 in the counterweight 36, and is further guided by a socket 181. A spring 182 mounted between said socket and the cap 183 of the piston tends to maintain the latter in as high a position as is allowed by a flange 184 provided on the said piston.

Below the socket 181 is formed a chamber 185 communicating with a recess 186 located below the piston 179, by means of a conduit 187 whose section can be modified at will by a screw valve-needle 188. In the lower part of the piston is a central aperture 189 which can be closed at the bottom by a clack-valve 190 which is urged upon its seat by a spring 191; said aperture communicates at the top with the chamber 185, through one or more holes 192.

The support 38a is provided with a horizontal arm adapted to maintain a combination of parts forming an adjustable stop for the said piston 179. The stop consists of a screw 192 having at the bottom an appendage 193 in which is a groove engaging a fixed guide 194; said screw is given a vertical movement by means of a worm-wheel 195 (Figs. 13 and 14) co-operating with a worm 196 which can be rotated by a hand-wheel 197 connected with the said worm by two driving shafts 198—199 which are connected together by bevel gearing 200.

Before this device is put in service, the chambers in which the piston moves are supplied with an incompressible liquid such as oil.

The operation is as follows. When the counterweight 36 is about to rise, the piston 179 is entirely raised by the action of the spring 182, and the oil is contained below the piston. The height of the screw 192 has already been regulated in such manner that before the counterweight 36 attains its highest point, the upper cap 183 of the piston 179 will make contact with the appendage 193, and thus, due to the difference between the weight of the movable parts 23—31—32—33—34—30—35, and the weight of the counterweight 36, an upward pressure will be exerted upon the oil situated below the piston, causing the oil to rise in the chamber 185 as supplied through the orifice determined by the valve-needle 188. For this reason, during the whole time of this flow of oil, the counterweight 36 will gradually rise, at a rate corresponding to the oil flow. On the other hand, the blank mould can be lowered into the glass at the same progressive rate as that of the oil flow.

The return of the oil from the upper chamber 185 to the lower chamber 186 takes place automatically, due to the rise of the piston 179 which tends to set up a vacuum below it, thus opening the valve 190.

The socket 181, by reason of its screwed part, permits to vary the stroke of the piston 179, this stroke being related to that of the blank mould during the operation of the device.

The valve-needle 188 serves to vary the rate of action of the device. For instance, in the manufacture of small bottles, the orifice will be opened to a greater degree than in the case of large bottles, for which a larger amount of glass must be taken up.

The driving device consisting of the hand-wheel 197 acting through the medium of the right-angles shafts, the bevel gearing, and the worm gearing, upon the stop screw 192, serve to vary the lowest point of immersion of the blank mould in order to adapt it to the level of the glass in the trough.

To recapitulate, it will be observed that the suitable operation of the various devices above described will permit the blank mould to follow the upper level of the glass in the trough 44, according as the glass is withdrawn by suction.

Obviously, the said invention is not limited to the forms of construction herein described and reperesented, which are given solely by way of example. For instance, the amount of rotation of the arm 23 may be limited to 90° or to any other value.

The said machine which has been described by way of example as relating to the manufacture of large or small bottles, is equally applicable to the manufacture of all blown articles in general. In certain particular cases, the blow head 102 may be eliminated and the suction head itself may be used in its place; herein the supporting arm 23 will remain in its stopped position adjacent the finishing mould 29 during the whole time required for the final blowing of the article in the mould. For this purpose, it is simply necessary to slightly modify the curvature of the aforesaid cams.

The machine is further applicable to the manufacture of rotated and blown articles, and to this end the finish ring mould holder or the finishing mould itself, will be rotated during the blowing operation.

The machine may also serve for the manufacture of solid articles such as stoppers, lenses, glass tile, and the like.

In this latter case, the blank mould consists of two halves or shells in which the shape of the article is formed in sunken relief, and it may employ in combination a mandrel adapted to press the glass upwardly. On the other hand, the principle of the several devices comprised in the machine is applicable to the manufacture of pressed and blown articles.

The machine herein described comprises but a single set consisting of a blank and a finishing mould, but its principle can be applied to a machine with multiple moulds, by making the necessary changes.

Having now described my invention what I claim as new and desire to secure by Letters Patent is:

1. In a glass gathering and shaping automatic machine for the manufacture of bottles and other glass articles, movable finish ring and blank moulds, a stationary finishing mould, a horizontal arm supporting said finish ring and blank moulds, a member rotatable about its vertical axis and operatively connected with said arm in order to bring by a horizontal movement the finish ring and blank moulds adjacent said stationary finishing mould disposed on the same level and to return them into their initial position, a gear on said rotary member, a spindle, a rack pivoted about said spindle and meshing with said gear, a continuous cam acting upon said spindle and forcing same to take an alternate motion, guide ways and rollers on said guide ways, said rollers being adapted to support said arm and to assure in cooperation with said guide ways the vertical displacements of said arm on said rotatable member, said displacements taking place only when it is desired to fill the moulds.

2. In a glass gathering and shaping automatic machine for the manufacture of bottles and other glass articles, a finish ring mould, a blank mould, a stationary finishing mould, a horizontal arm supporting said finish ring and blank moulds, a member rotatable about its vertical axis and operatively connected with said arm in order to bring the finish ring and blank moulds adjacent said finishing mould and to return them into their initial position, a gear on said rotary member, a spindle, a rack pivoted about said spindle and meshing with said gear, a horizontal rotary plate mounted on the vertical axis of said rotary member, a continuous cam on said plate acting upon said spindle and forcing same to take an alternate motion, guide ways and rollers on said guide ways, said rollers being adapted to support said arm and to assure in cooperation with said guide ways the vertical displacements of said arm on said rotatable member.

3. In a glass gathering and shaping automatic machine for the manufacture of bottles and other glass articles, a finish ring mould, a blank mould, a finishing mould, a horizontal arm supporting said finish ring and blank moulds, a member rotatable about its vertical axis, and operatively connected with said arm in order to bring the finish ring and blank moulds adjacent said finishing mould, and to return them into their initial position, guide ways and rollers on said guide ways, said rollers being adapted to support said arm and to assure in cooperation with said guide ways the vertical displacements of said arm on said rotatable member, a socket loosely mounted on the vertical axis of said rotary member, said socket supporting said arm and connected therewith as to its vertical displacements, and a counterweight partially balancing the weight of all the aforesaid members.

4. In a glass gathering and shaping automatic machine for the manufacture of bottles and other glass articles, a finish ring mould, a blank mould, a finishing mould, a horizontal arm supporting said finish ring and blank moulds, means adapted to impart to the said arm successively a vertical descending movement, bringing said moulds in contact with the liquid glass in order to fill them, a vertical raising movement and a circular alternate movement in a horizontal plane bringing the said finish ring and blank moulds adjacent the finishing mould in order to transfer the blank in this latter mould and to replace the said two first mentioned moulds in their initial position ready for another operation, the means controlling the vertical displacements of said finish ring and blank moulds being adapted to act at will upon the speed of descent of the blank mould between the two movements when the mould enters in contact with the glass level and that one when said mould has reached the deepest point of its path in order to consider the lowering of the glass level in the trough during the filling operation.

5. In a glass gathering and shaping automatic machine for the manufacture of bottles and other glass articles, a horizontal arm, a finish ring mould and a blank mould both disposed on said arm, means for actuating said arm in a vertical direction, a piston operatively connected with said arm during the sliding movement of the latter, a cylinder with an incompressible liquid, containing said piston and an adjustable orifice leaving a passage for the liquid.

6. In a glass gathering and shaping automatic machine for the manufacture of bottles and other glass articles, a horizontal arm, a finish ring mould and a blank mould both disposed on said arm, means for actuating said arm in a vertical direction, a counterweight for partially balancing said arm, a bore preferably provided in said counterweight, a piston located in said bore, and drawing therein an incompressible liquid, and an adjustable stop for said piston, for controlling the moment when said piston begins to act upon the descent speed of said arm.

7. In a glass gathering and shaping automatic machine for the manufacture of bottles and other glass articles, a finish ring mould, a blank mould, a finishing mould, means adapted to impart to the finish ring and blank moulds successively a vertical descending movement, bringing said moulds in contact with the liquid glass in order to fill them, a vertical raising movement, and a circular alternate movement in a horizontal plane bringing the said finish ring and blank moulds adjacent the finishing mould in order to transfer the blank in this latter mould and to replace the said two first mentioned moulds in their initial position ready for another operation, and rotary tools adapted to bevel, trim and round the bottom of the blank.

ETIENNE FÉCHOZ.